United States Patent [19]

Erk et al.

[11] 4,303,711

[45] Dec. 1, 1981

[54] TUBULAR FILM FOR PACKING AND CASING PASTE-TYPE FOODSTUFFS ESPECIALLY SAUSAGE AND CHEESE

[75] Inventors: Gayyur Erk, Gorxheimertal, Turkey; Rudi Korlatzki, Laudenbach, Fed. Rep. of Germany

[73] Assignee: Naturin-Werk Becker & Co., Weinheim, Fed. Rep. of Germany

[21] Appl. No.: 94,057

[22] Filed: Nov. 14, 1979

[30] Foreign Application Priority Data

Nov. 17, 1978 [DE] Fed. Rep. of Germany ....... 2850181
Nov. 17, 1978 [DE] Fed. Rep. of Germany ....... 2850182

[51] Int. Cl.$^3$ ..................... F16L 11/00; B65D 85/00
[52] U.S. Cl. .................................. 428/36; 138/118.1; 426/105; 426/106; 426/129; 426/130; 264/209.5; 264/235.8; 264/564
[58] Field of Search ................ 428/36; 426/105, 106, 426/135, 129, 130, 412, 415; 138/118.1; 264/209, 564, 235.8

[56] References Cited

U.S. PATENT DOCUMENTS

| | | | |
|---|---|---|---|
| 3,151,989 | 10/1964 | Sacks et al. | 426/129 |
| 3,955,040 | 5/1976 | Schirmer | 426/129 |
| 3,995,084 | 11/1976 | Berger et al. | 426/115 |
| 4,197,326 | 4/1980 | Wakamatsu et al. | 138/118.1 |

FOREIGN PATENT DOCUMENTS

| | | |
|---|---|---|
| 1959318 | 6/1970 | Fed. Rep. of Germany . |
| 1905539 | 9/1970 | Fed. Rep. of Germany . |
| 1965479 | 8/1971 | Fed. Rep. of Germany . |
| 1461842 | 9/1971 | Fed. Rep. of Germany . |
| 1770406 | 2/1972 | Fed. Rep. of Germany . |
| 2744713 | 4/1978 | Fed. Rep. of Germany . |

*Primary Examiner*—William R. Dixon, Jr.
*Attorney, Agent, or Firm*—Brumbaugh, Graves, Donohue & Raymond

[57] ABSTRACT

The invention relates to a tubular film for packing foodstuffs that in the state in which they are introduced into the tube are paste-like or fluid and that either after packing are heated to approximately 70° to 95° C. or are packed in the hot, fluid state. The tubular film consists of at least one aliphatic polyamide, of which the glass transition temperature of $\geq 321$ K in the dry state can be lowered, by moisture absorption, to 293 K, or of a mixture of this polyamide with at least one ionomer resin, wherein the ionomer resin may be partly or completely replaced by a modified ethylene/vinyl acetate copolymer. The tubular film according to the invention lies wrinkle-free against the contents after cooling. The tubular film is produced by shaping the plastic or plastic mixture and subjecting to biaxial stretching according to processes that are known per se.

32 Claims, No Drawings

TUBULAR FILM FOR PACKING AND CASING PASTE-TYPE FOODSTUFFS ESPECIALLY SAUSAGE AND CHEESE

The invention relates to a tubular film for packing foodstuffs which have a paste-type or fluid consistency when packed, and either are subjected to heat treatment, such as boiling or scalding, at temperatures in the range of approximately 70° to 95° C., after packing and casing at room temperature, or are packed in the hot, fluid state. The invention relates especially to a casing for boiled and scalded sausages and cheese sausages, that is, soft cheese packed in the shape of a sausage, which is usually introduced into the casing in the softened or fluid state.

In order to be suitable in practice, casings for foodstuffs such as boiled and scalded sausage, or cheese packed like sausage, must meet a number of requirements. The most important of these requirements are:

(1) Even after the packed material (scalded sausage or soft cheese) has cooled, the casing must lie wrinkle-free against this material, which has shrunk on cooling, i.e., the casing must not be wrinkly since a wrinkled or shrivelled appearance is equated by the consumer with old food that is no longer fresh.

(2) The casing must not be permanently deformed either when filled or as a result of the pressure of the contents which expand on heating, i.e., it must retain its exact cylindrical shape and must not curve or bulge.

(3) The casing must be adequately resistant to the temperatures to which it is exposed during boiling and scalding or when introducing fluid material, so that the casing does not burst or tear at these elevated temperatures. In practice, the resistance to temperature must be such that the casing material still has at least 50% of its room temperature strength at temperatures up to 125° C.

(4) It must be possible to gather and clip the casing without damaging it.

(5) The casing should have a high degree of flexibility and a soft feel so that the operating personnel do not scrape the skin on their hands if the casing is filled manually.

(6) A specific requirement of a casing for boiled and scalded sausages made by the expert is that as little as possible of the sausage jelly should be deposited between the sausage meat and the casing, since this is felt to be a serious drawback by both the meat processor and the consumer.

As yet, there are no known sausage casings made of a cheap plastic material that can be produced in a simple manner and that meet all of the above requirements.

Hitherto, collagen and paper coated with viscose have been the principal casing materials used for packing boiled and scalded sausages and cheese compositions. Although these customary commercial casings have properties ranging from good to excellent, they are very costly because they can be produced only (1) by time-consuming manufacturing steps;
(2) by means of expensive special plant;
(3) with the use of strong acids and alkalis that require special handling materials.

During the manufacture of these casings, reaction products are produced that cause pollution of the environment, such as carbon disulphide in the case of viscosecoated casings. In addition, casings of this type are susceptible to decay and therefore cannot be stored indefinitely.

Also known are single-layer, unstretched plastic casings consisting of higher homopolyamides (polyamide 11 and polyamide 12) as well as plastic casings consisting of such polyamides coextruded in two layers with polyamide 6 as the outer layer.

Although these casings may be produced simply and with little pollution to the environment, they have considerable drawbacks. First, when they are filled with the sausage meat at filling pressures of 0.3 to 0.6 bar, they are deformed in such a way that they are no longer exactly cylindrical, and, secondly, when boiled and scalded, sausages having such a casing are cooled to temperatures of 3° to 5° C., as is customary in cold storage, they have a shrivelled or wrinkled appearance.

The first drawback, the deformation caused by the filling pressure, is known to the expert by the expression "mangelhafte Kalibertreue" ("lack of calibre stability") and means that goods packed in such casings cannot be used in automatic further processing or for sliced foods. The second drawback, namely, the wrinkled appearance of the cooled sausage, is viewed with disfavour, especially by the consumer who considers such a wrinkled product to be old and possibly contaminated. Furthermore, while the sausages are matured by hanging in the scalding chamber, an elongated "tip" forms in these casings in which the sausage jelly is deposited preferentially. This is also regarded as undesirable by the expert.

Apart from these unstretched single-layered or double-layered polyamide sausage casings, biaxially stretched sausage casings of polyethylene terephthalate (PETP), polyvinylidene chloride copolymers (PVDC), and tubular films of higher homopolyamides stretched monoaxially only in the longitudinal direction, belong to the state of the art. The biaxially-stretched sausage casings of PETP and PVDC do have a much improved tensile strength and calibre stability when being filled than unstretched plastic sausage casings consisting of polyamides, but result in wrinkle-free sausages only if they are subjected, after cooling, to additional heat treatment which is known to the expert as "after-shrinking". "After-shrinking" means that the sausage cooled to a temperature of approximately 3° C. is heated to above 80° C. for a few seconds in a hot water bath or by hot air treatment. During this treatment, the casing shrinks and lies more closely and wrinkle-free against the sausage meat, the volume of which has been reduced by cooling. This additional after-shrinking is not, however, normally included in the known manufacturing process for boiling and scalding sausages. Consequently, this subsequent processing step, which requires additional devices and energy, is not, or not willingly, accepted by the expert. Apart from the wrinkle-formation, biaxially stretched sausage casings of PETP and PVDC also exhibit an unfavorable deposition phenomenon, i.e., sausage jelly collects in considerable quantities between the sausage material and the sausage casing after maturing, which is considered a drawback by the consumer.

A further disadvantage of biaxially stretched sausage casings made of PVDC copolymers is their difficult production engineering, which is caused by the very narrow melting range of these thermoplasts necessitating the use of special machines, and by the splitting off of corrosive hydrochloric acid causing both pollution and material handling problems.

The sausage casings made of higher homopolyamides, stretched monoaxially only in the longitudinal direction, do not have adequate transverse strength and therefore have the same drawbacks as the unstretched sausage casings with respect to calibre stability and freedom from wrinkles.

The problem of the invention is therefore to provide a plastic casing for paste-type foodstuffs, especially for boiled and scalded sausages and for cheese sausage, that can be produced easily and cheaply, with little pollution, using customary plastic processing machines, and which meets the requirements described at the beginning and thus does not have the disadvantages of the known fibre-containing and nonfibre-containing plastic casings.

This problem is solved in accordance with the invention by a casing made of a shrinkably-stretched plastic material, which comprises at least one aliphatic polyamide having a glass transition point in the dry state $\geq 321$ K. ($\geq 48°$ C.) which can be lowered, as a function of moisture absorption, at least to $276°$ K. ($3°$ C.), preferably to $268°$ K. ($-5°$ C.) and especially to $253°$ K. ($-20°$ C.), or of a mixture of this polyamide with at least one ionomer resin and/or with a modified ethylene/vinyl acetate polymer and/or modified polyolefine. The glass transition point is the temperature above which the plastic is soft and elastic, and below which it is brittle like glass. The glass transition point is measured according to DIN 53445 measuring the torsional module dependant on the temperature and moisture content of the sample.

Typical polyamides that are suitable for the purpose of the invention are those having a glass transition point $T_g$, which is shifted by water absorption to lower temperatures of approximately $0°$ C.

Examples of suitable polyamides are: polyamide 6 (polycaprolactam or alternatively poly-$\epsilon$-caproic acid amide), polyamide 7 (polyamino-oenanthic acid amide), polyamide 6,6 (polyhexamethyleneadipic acid amide), and polyamide 6,10 (polyhexamethylenesebacic acid amide).

The polyamides may be used alone or in admixture with one another. Also suitable are copolymers consisting of at least two of the aforementioned polyamides with one another. Further suitable are copolymers and/or mixtures consisting of at least one of the aforementioned polyamides with polyamide 11 (polyaminoundecanoic acid amide) and/or polyamide 12 (polylaurin lactam), provided only that the mixture and the copolymers meet the requirements of the shifting of the glass temperature.

Of the aforementioned polyamides, polyamide 6 is especially preferred.

For blow-extrusion purposes, polyamides having a relative viscosity in the range of approximately 2.5 to 4.5, preferably approximately 2.8 to 4.2 measured in a solution of 1 g polyamide in 100 ml 96% $H_2SO_4$ according to DIN 53727 are preferred.

The tubular film consisting, according to the invention, only of polyamides, polyamide mixtures or copolymers of polyamides meets all the requirements listed above and is therefore already excellently suitable for practical purposes. By adding ionomer resins and/or modified ethylene/vinyl acetate copolymers, and/or modified polyolefines the properties of this tubular film may be even further improved, especially with respect to permeability to water vapor and gas and as to tear propagation resistance.

Ionomer resins mean in this case direct or indirect copolymers of ethylene with an $\alpha,\beta$-ethylenically unsaturated monocarboxylic acid that contain ethylene in a quantity of at least 50 mole %, and the rest up to 100% is formed by an acid derivative and/or an acid monomer of said acid, preferably in quantities of 5 to 25 mole %, calculated on the copolymer. Preferred acid derivatives are alkyl esters or acid anhydrids of said acids. Ionomer resins of this type have a melt-flow index of from approximately 0.5 to 40, preferably 0.5 to 10, and contain in uniform distribution a metal ion having an ionic valency of 1 to 3, preferably 2. Preferably at least 10% of the carboxyl groups of the acid in the copolymer are neutralized by the metal ion which is present in the ionic state.

Preferred as ionomer resins are the inorganic salts of ethylene/acrylic acid or ethylene/methacrylic acid copolymers that contain the acrylic acid or methacrylic acid, respectively, copolymerized in a quantity of approximately 2 to 25% by weight. Especially preferred inorganic salts are zinc and calcium salts. Ionomer resins of this type are marketed under the trade name Surlyn Resin No. 1650 and 1652, manufactured by Messrs. DuPont Chemical Co.

Instead of or in addition to these ionomer resins it is also possible to use special modified polyolefins. Suitable modified polyolefins are quaternary polymers that consist of approximately 71 to 90 parts by weight of ethylene, 3 to 9 parts by weight of an aliphatic ethylenically unsaturated carboxylic acid having 3 to 5 carbon atoms, approximately 1 to 20 parts by weight of an ester of an aliphatic, ethylenically unsaturated carboxylic acid having 3 to 5 carbon atoms with alcohols that contain 1 to 8 carbon atoms, and of 0.3 to 5 parts by weight, preferably 0.8 to 3 parts by weight, of isobutylene, wherein the sum of the parts by weight is 100. A particularly preferred modified polyolefin of the aforementioned type consists of:

71 to 90 parts by weight of ethylene;
3 to 9 parts by weight of acrylic acid;
1 to 20 parts by weight of the tert.-butyl ester of acrylic acid; and
0.8 to 3 parts by weight of isobutylene;

wherein the total parts by weight is 100 and the constituents are in a polymer-bonded form. Also suitable in addition to or instead of an ionomer resin and/or the aforesaid modified polyolefines are the plastics disclosed in DE-OS 27 21 474 and 27 21 475, the subject of which is incorporated into this application by way of reference. These plastics are known under the trade names 'Plexar' (manufacturer, Chemplex Company). Plexars are blends of (I) graft polymer of an $\alpha$-olefine, preferably HDPE, which is grafted with an acyclic, isocyclic or heterocyclic acid anhydride, for example x-methylbicyclo[2,2,1]hept-5-en-2,3-dicarboncarboxylic acid anhydride (XMNA) with either (II) EVA-copolymers, for example with vinyl acetate-proportions of about 5% by weight or (II)$_2$ HDPE, LDPE and/or co-and terpolymers of HDPE or LDPE with propylene, butene and dienes.

The afore-mentioned graft polymer blends consist of 1 to 30, especially 3 to 12% by weight of component I, and of 99 to 70, especially 97 to 88% by weight of component II. A typical example of such a polymer blend consists of about 5% by weight of an HDPE grafted with about 1% by weight of XMNA having a melt-index of 0,8 g/10 min. as component I and 95% by weight of an EVA-copolymer having a melt-index of 1.0 g/10 min., a density of 0.929 g/ccm and a vinylacetate content of 4.7% by weight, as component II.

Another trade name of the aforementioned suitable types of plastics are "Admer" (manufacturer, Mitsui Polychemicals Company, Ltd.) and "CXA" (manufacturer, DuPont).

Details of these plastics are given in table 1.

TABLE 1

| Synthetic resin: Manufacturer: | PLEXAR Chemplex-Company USA | | ADMER Mitsui Polychemicals Comp. Ltd., Japan | | CXA-Resin DuPont De Nemours USA |
| --- | --- | --- | --- | --- | --- |
| Preferred types: | Plexar | Plexar 3 | LF 300 | LF 305 | CXA 3095 |
| Melt-flow index ASTM D 1238-57T g/10 min. | 1.0 | 3.0 | 1.3 | 1.0 | 1.3 |
| density ASTM 1505-63T g/cm$^3$ | 0.93 | 0.93 | 0.92 | 0.925 | — |
| Vicat-softening point ASTM 1525-58T °C. | 90–100 | | 92 | 83 | 90–100 |
| chemical information | chemically modified ethylene/vinyl acetate polymers | | chemically modified polyolefins | | chemically modified polyolefins |

In the following, the polyamides are referred to as component "A" and the ionomer resins, modified polyolefines and modified EVA-copolymers as component "B".

By admixing components A and B, new properties are obtained that the individual components of the mixture do not possess in their own. In such mixtures, component A constitutes from 50 to 99 parts by weight, preferably 70 to 86 parts by weight and especially 75–83 parts by weight. Component B constitutes from 1 to 50 parts by weight, preferably 14 to 30 parts by weight, and especially 17 to 25 parts by weight with component A and B together making 100 parts by weight. It has thus surprisingly been shown that a casing produced from the mixture according to the invention is constructed from a number of layers, although no coextrusion process has been used. The phenomenon of multiple layering within a monofilm can thus be observed here. A casing according to the invention that has been produced by stretching biaxially the corresponding plastics molding composition consisting of the components A and B surprisingly has a tear propagation resistance that is up to ten times higher than that of the biaxially stretched component A, from which it is obvious that there is a direct connection between the observed multiple-layering of the new film and the increase in tear propagation resistance. This effect is most noticeable in the especially preferred range of 17 to 25 parts by weight of component B in the mixture according to the invention. Also, the plastics mixture of components A and B, according to the invention, is surprisingly considerably better suited to biaxial stretching than component A on its own. The improved stretching property consists, firstly, in an optically clearly determinable homogenization of the stretching bubble, which is free from unstretched areas. Secondly, a considerable reduction in the required stretching forces was observed, enabling continuous stretching over any period. The increase in the proportion of component B in the mixture according to the invention to more than 50% causes noticeable deterioration in terms of the criteria essential for its use as a casing, for example, increase in gas permeability, reduction in tensile strength, and reduction in temperature resistance. The shifting of the glass transition point from 48° C. to, advantageously, −20° C. is no longer necessary.

The casing, according to the invention, furthermore has the following advantages:

(1) Since it consists of a thermoplasticallyprocessable plastics biaxially stretched in tube form, of which the glass transition temperature may be reduced in accordance with the moisture absorption to less than 3° C., the casing lies against the contents even after complete cooling has occurred and still has an elastic tension.

(2) Owing to the biaxial stretching of the casing, which is undertaken in such a way that in the stretched state the breaking stress is at least 2.5 times the breaking stress in the non-oriented state (that is, the unstretched state), the stress-strain curve follows up to 10% below the breaking stress. Hence, irreversible deformation of the casing while filling and scalding the sausage, is avoided. Such a casing can withstand the customary sausage-filling pressures of 0.3 to 0.6 bar without becoming permanently deformed.

(3) The casing according to the invention is also adequately resistant at high temperatures of up to approximately 125° C.

(4) The casing according to the invention may be gathered and clipped without damage, since its notch impact strength retains a value of 40 to 60 Ncm/cm$^2$ to 0° C. without appreciable loss.

(5) The casing according to the invention has a high degree of flexibility and a soft feel.

(6) The casing according to the invention meets the requirements made of it regarding permeability to water vapor and gas.

(7) The casing according to the invention exhibits practically no deposit of jelly or fat between the sausage meat and the casing if the sausage meat has been produced according to a good trade process. Even with this proviso, there were always difficulties hitherto with sausage casings of thermoplastic plastics which people sought to overcome by increasing the concentration especially of protein-compatible functional groups, such as carboxyl and carbon-amide groups, in the layer facing the sausage material. This increase in concentration of groups compatible with the sausage material must be limited, however, in the known sausage casings. A concentration of more than 10% by weight of such protein-compatible functional groups weakens the strength properties in PVDC copolymers in such a manner that the filling strength and calibre stability of sausages produced in such casings can no longer be guaranteed. The sausage casings according to the invention have, from the beginning in the most unfavorable case, a far higher concentration of carboxyl and carbonamide groups than PVDC copolymer sausage casings without the filling strength and calibre stability being adversely affected.

(8) The sausage casing according to the invention has an extremely high tear propagation resistance which, depending on the proportion of the mixing component B, is up to 400 N/mm, whereas the known biaxially stretched casings of PVDC copolymers and PETP have tear propagation resistances only in the order of magnitude of 10 to 30 N/mm according to DIN 53 363.

A high tear propagation resistance is an important prerequisite especially for trouble-free vacuum packing of cut sausages. The sausage, ready for selling, is usually cut into pieces for vacuum packing purposes and these pieces are individually vacuum-packed. When a plump, wrinkle-free sausage is cut, very small tears appear in the casing at right angles to the cutting face. When a piece of sausage cut in this manner arrives at the vacuum-packing machine, the air enclosed in the porous structure of the sausage composition expands under the effect of the vacuum in such a manner that the stress on the sausage is increased considerably and if the tear propagation resistance is inadequate, this results in the tears produced by cutting tearing further. All of the hitherto known biaxially stretched plastics films, including the films of PETP and PVDC copolymers, have inadequate tear propagation resistance.

The casing according to the invention is produced by shaping the components A and B into a tubular film in a manner known per se, preferably in accordance with the blow film process. the poly-amide, ionomer resin, modified EVA copolymer and/or modified polyolefins are mixed likewise in a manner known per se. Following the film manufacture, the biaxial stretching is likewise carried out according to known methods with stretching ratios, longitudinally and transversely, in the range of approximately 1:1.5 to 1:4, the film being so stretched that in the stretched state the typical breaking stress is 2.5 times the breaking stress in the unstretched state and the stress-strain curve typically extends according to Hooke's elasticity law up to approximately 10% below the breaking stress. Preferably the so-called "Inflated bubble technique" is used for the stretching process, stretching being effected by means of a bubble filled with gas.

Following the stretching, there is optionally a thermofixing treatment for the purpose of dimensional stabilization, which is also known, and after this there may be known finishing treatments.

It is also possible, after the biaxial stretching, first of all to make the tubular film helical in shape according to a known process and then to subject it to thermofixing.

The invention is explained by the following examples:
I. Examples Without Component B.

Example 1

Pure polycaprolactam having a relative viscosity of 4 (measured as 1 g of granulate in 100 ml of 96% sulphuric acid at 20° C.) and a melting point of 220° C., is plasticized in a double screw extruder at a temperature of 260° C. and extruded through an annular die to form a tube of 20 mm diameter and 0.450 mm wall thickness. After hardening the tube by cooling with precooled air, it is stretched in a stretching bubble to form a biaxially stretched tube of a wall thickness of 0.050 mm and a diameter of 60 mm, then thermofixed by blowing warm air over it and rolled up. The surface stretching ratio is 1:9. (longitudinally: 1:2,5, transversely: 1:3,6) In the stretching process, owing to the instability of the stretching bubble, defects do occur from time to time.

The properties of this casing that are important for its use as a sausage casing, are shown in Table 2.

The flexibility (see column 12 of Table 2) of the casings according to the invention is already very good without any additional soaking, so that such a soaking process, which is considered necessary for numerous casings known in the art but which, for reasons of hygiene, is objected to owing to the high number of germs in the soaking bath, can be omitted. In some cases, however, the flexibility and thus the elastic property of the casing can be even further improved by soaking briefly before filling. The Table shows clearly the good properties (freedom from wrinkles, extreme flexibility, good adhesion to the sausage meat and good clipping and gathering properties), whereas the stretchability is somewhat impaired by instability of the stretching bubble.

Example 2

A polyamide mixed condensation product consisting of 16 parts by weight of polycaprolactam, 55 parts by weight of polyhexamethyleneadipic acid amide and 29 parts by weight of polymexamethylenesebacic acid amide having a melting point of 160° C. and a relative viscosity of 2.7 (measured as 1 g of granulate in 100 ml of 96% sulphuric acid at 20° C.) is plasticized in a double screw extruder at a temperature of 210° C. and is extruded through an annular die to form a tube of 20 mm diameter and 0.450 mm wall thickness.

After hardening the tube by cooling with precooled air, it is stretched by means of a stretching bubble to form a biaxially stretched tube of a wall thickness of 0.045 mm and a diameter of 66 mm, and subsequently thermofixed with hot air of approximately 120° C. for 5 minutes then wound up.

The surface stretching ratio is 1:10.
(longitudinally: 1:3, transversely: 1:3,3)
The properties of this casing that are important for its use as a sausage casing are shown in Table 2.

Example 3

A polyamide blend (polyamide mixture) of 19 parts by weight of polycaprolactam and 81 parts by weight of polyhexamethyleneadipic acid amide having a melting point of 240° C. and a relative viscosity of 4.2 (measured as 1 g of granulate in 100 ml of 96% sulphuric acid at 20° C.) is plasticized in a double screw extruder at 275° C. and extruded through an annular die to form a tube of 20 mm diameter and 0.450 mm wall thickness.

After hardening the tube by cooling with precooled air, it is stretched by means of a stretching bubble to form a biaxially stretched tube with a wall thickness of 0.050 mm and a diameter of 60 mm, and then thermofixed by blowing with hot air of 120° C. for 3 minutes and wound up.

The surface stretching ratio is 1:9.
(longitudinally: 1:3, transversely: 1:3)
The properties of this casing that are important for its use as a sausage casing are shown in Table 2.

Example 4 Wreath

Customary commercial polycaprolactam with a relative viscosity of 4.0 (measured in 1 g of granulate in 96% sulphuric acid at 20° C.) was plasticised in an extruder manufactured by Messrs. Leistritz, Type ESE 40, and extruded through an annular die to form a tube of 13.8 mm diameter and 360 μm wall thickness.

The resulting substantially amorphous primary tube was then biaxially stretched according to processes known per se and made into a wreath shape, again according to processes known per se.

The wreath, filled in a practical test with sausage meat, had a ring diameter of 175 mm, a skin diameter of 43 mm and a wall thickness of approximately 40 μm.

II. Examples With Component B.

Example 5

A mixture of 75 parts by weight of customary commercial polycaprolactam granulate with a relative viscosity of 4 (measured as 'g of granulate in 100 ml of 96% sulphuric acid at 20° C.) and 25 parts by weight of customary commercial ionomer resin with a melt-flow index of 5.0 as well as a zinc ion type, is mixed in a dry tumbler for 10 minutes, plasticized in a double screw extruder at 260° C. and extruded through an annular die to form a tube of 20 mm diameter and 0.450 mm wall thickness. In continuous operation, this primary tube is then biaxially stretched according to processes known per se, thermofixed and wound up. The surface stretching ratio is 1:9.

(longitudinally: 1:3, transversely: 1:3)

A biaxially stretched tube of 0.050 mm wall thickness and 60 mm diameter is obtained.

Example 6

A mixture of (1) 80 parts by weight of a polyamide mixed condensation product of 50 parts by weight of polycaprolactam, 30 parts by weight of polyhexamethyleneadipic acid amide, 16 parts by weight of polyhexamethylenesebasic acid amide, and 4 parts by weight of polyamino-undecanoic acid amide having a relative viscosity of 2.9, and (2) 20 parts by weight of a quaternary ethylene/vinyl acetate copolymer consisting of 84.0 parts by weight of ethylene, 4.5 parts by weight of acrylic acid, 7.0 parts by weight of tertiary butyl acrylate and 1.5 parts by weight of isobutylene and having a density of 0.924 g/cm$^3$ and a melt-flow index of 0.6, is plasticized as described in Example 5 at 210° C. and processed to form a biaxially stretched sausage casing with the same dimensions.

Example 7

A mixture of (1) 90 parts by weight of a polyamide, 18 parts by weight of polycaprolactam, and 82 parts by weight of polyhexamethyleneadipic acid amide, having a relative viscosity of 4.2, and (2) 10 parts by weight of ionomer resin with a melt-flow index of 1.4 and a zinc ion type as component B, is extruded as described in Example 5 to form a biaxially stretched, multi-layered sausage casing.

The properties of the casings according to the invention are shown in Table 2 and compared with properties of sausage casings of the state of the art.

Example 8 Wreath

A mixture consisting of (a) 83 parts by weight of commercial polycaprolactam with a relative viscosity of 4.0 (measured at 20° C. in 1% solution in 96% sulphuric acid) and (b) 17 parts by weight of commercial ionomer resin of the Zn ion type with a melt-flow index of 5.0 was plasticized in a double screw extruder produced by Messrs. Leistritz, Type ZSE 30/34 and extruded through an annular die to form a tube of a diameter of 13.8 mm and a wall thickness of 360 μm.

The resulting substantially amorphous primary tube was then biaxially stretched and shaped into a wreath in a conventional manner.

The wreath-shaped skin filled in the practical test with meat had an inner ring diameter of 175 mm, a skin diameter of 43 mm and a wall thickness of approximately 40 μm.

The flexibility (see column 12 of Table 2) of the casings according to the invention is already very good without additional soaking, so that such a soaking in water, which is regarded as necessary for numerous casings known in the art but which, for reasons of hygiene owing to the high number of germs in the soaking bath is objected to, can be omitted. In some cases, however, the flexibility and thus the elastic property of the casing can be even further improved by soaking briefly before filling.

TABLE 2

COMPARISON OF THE TECHNOLOGICAL PROPERTIES OF THE SAUSAGE CASINGS ACCORDING TO THE INVENTION WITH THOSE OF THE SAUSAGE CASINGS KNOWN IN THE ART

| 1 | 2 | | 3 | | 4 | 5 | 6 | 7 | 8 | 9 | 10 | 11 | 12 | 13 | 14 |
|---|---|---|---|---|---|---|---|---|---|---|---|---|---|---|---|
| Technological properties sausage casing consisting of | Composition parts by weight | | Breaking stress (M/mm²) (1) | | Tear propagation (N/mm) (DIN 53363) | Film thickness (mm) | Diameter of tubular film (mm) | Permeability to water (g/m²·day) (DIN 53122) | Permeability to O₂ cm³/m²·day·bar | Stretchability | Gathering property (2) | Clipping strength (3) | Flexibility assessed by feel of the casing (4) | Wrinkle formation judged optically (5) | Adhesion to meat (mg/cm²) (5) |
| | A | B | longitudinal | transverse | | | | | | | | | | | |
| PVDC Copolymer state of art | — | — | 47 | 81 | 35 | 0,050 | 60 | 2,1 | 7,0 | — | 27 | 21 | soft | wrinkled | 3 |
| PETP-state of the art | — | — | 261 | 290 | 30 | 0,025 | 60 | 20,0 | 80,0 | — | 0 | 2 | stiff | very wrinkled | 20 |
| RESULTS OF EXAMPLES WITHOUT COMPOUND B | | | | | | | | | | | | | | | |
| Example 1 | 100 | — | 150 | 190 | 20 | 0,050 | 60 | 50,0 | 10,0 | limited | 0 | 2 | extremely soft | no wrinkles | 125 |
| Example 2 | 100 | — | 138 | 129 | 30 | 0,045 | 63 | 45,0 | 16,0 | limited | 0 | 2 | very soft | no wrinkles | 103 |
| Example 3 | 100 | — | 160 | 180 | 21 | 0,050 | 60 | 48,0 | 9,0 | limited | 1 | 2 | very soft | no wrinkles | 118 |
| RESULTS OF EXAMPLES WITH COMPOUND B | | | | | | | | | | | | | | | |
| Example 5 | 75 | 25 | 105 | 120 | 298 | 0,050 | 60 | 12,0 | 15,0 | gut | 0 | 0 | very soft | no wrinkles | 110 |
| Example 6 | 80 | 20 | 85 | 100 | 190 | 0,050 | 60 | 28,0 | 30,0 | gut | 0 | 0 | very soft | no wrinkles | 120 |
| Example 7 | 90 | 10 | 70 | 90 | 340 | 0,050 | 60 | 18,0 | 17,0 | gut | 0 | 0 | very soft | no wrinkles | 80 |

Footnotes:
(1) Breaking stress measured according to DIN 53455.
(2) On a customary gathering machine, 200 m of tubular film were gathered to form 10 tubes each of 20 m. Each tube was sealed at one end, and blown up with air at 0.3 bar to the original length. The inflated tubular film was immersed in water and the number of holes caused by the gathering were counted; this number is given in the Table.
(3) 100 sausages were produced with the filling and clipping apparatus "FCA Super" manufactured by Messrs. Niedecker, Federal Republic of Germany. The number of points of damage to the sausage casings caused by the 200 clips put on were counted; this number is given in the Table.
(4) Assessed after storing for 20 minutes in water at 283 K. (20° C.)
(5) Measured in accordance with the method described in DT-OS 23 03 175 (pages 9 and 10).
Columns 10-11 = technical data concerning processing.
Columns 12-14 = technical data concerning use.

We claim:

1. A tubular film consisting of biaxially stretched plastic material for packaging and casing paste-type foodstuffs that either, after packing, are heated or are packed in a hot fluid state, comprising a mixture of
   (A) approximately 50–99 parts by weight of at least one aliphatic polyamide having a glass transition point in the dry state of at least 48° C. and a glass transition point after a moisture absorption of 3° C. or less and
   (B) approximately 1–50 parts by weight of one or more members of the group consisting of an ionomer resin, a modified ethylene-vinylacetate copolymer and a modified polyolefin.

2. A tubular film according to claim 1, wherein the polyamide has a glass transition point after moisture absorption of less than −5° C.

3. A tubular film according to claim 1, wherein the polyamide after moisture absorption has a glass transition point below −20° C.

4. A tubular film according to one of claims 1 to 3, characterized in that it contains a polyamide from the group consisting of polycaprolactam, polyaminooenanthic acid amide, polyhexamethyleneadipic acid amide and polyhexamethylenesebacic acid amide, or a mixture of at least two of these polyamides.

5. A tubular film according to claim 4, characterized in that it contains as polyamide a copolymer of at least two polyamides from the group consisting of polycaprolactam, polyamino-oenanthic acid amide, polyhexamethyleneadipic acid amide and polyhexamethylenesebacic acid amide or a mixture of at least one of these copolymers with at least one of these polyamides.

6. A tubular film according to claim 4, characterized in that it contains as polyamide a copolymer of polyamino-undecanoic acid amide or polylaurin lactam with at least one of the polyamides from the group consisting of polycaprolactam, polyamino-oenanthic acid amide, polyhexamethyleneadipic acid amide and polyhexamethylenesebacic acid amide or a mixture of at least one of these copolymers with at least one of these polyamides.

7. A tubular film according to claim 1, characterized in that it contains as the ionomer resin a copolymer of ethylene and an α,β-ethylenically unsaturated monocarboxylic acid, wherein the proportion of acid monomer in the copolymers is 5 to 25 mole % and the copolymer has a melt-flow index from approximately 0.5 to approximately 40, and has uniformly distributed in it a metal ion having an ionic valency of 1 to 3, and wherein at least 10% of the carboxyl groups are acid neutralized by the metal ion and are present in an ionic state.

8. A tubular film according to claim 7 characterized in that it contains as the ionomer resin a copolymer of ethylene and a member of the group consisting of an α,β-ethylenically unsaturated monocarboxylic acid, an α,β-ethylenically unsaturated dicarboxylic acid and a mixture of an α,β-ethylenically unsaturated mono-and dicarboxylic acid, which contains said unsaturated acid in a quantity of approximately 1 to 25 percent of weight.

9. A tubular film according to claim 8, characterized in that, in addition to the α,β-unsaturated carboxylic acid, and acid derivative is present in the copolymer.

10. A tubular film according to claim 9, wherein the acid derivative is an alkyl ester or an anhydride of the carboxylic acid.

11. A tubular film according to claim 8, when the ionomer resin is a copolymer of ethylene and a member of the group consisting of a acrylic acid, methacrylic acid and mixtures thereof.

12. A tubular film according to claim 7, wherein the copolymer of ethylene is present in a quantity of at least 50 mole % calculated on the copolymer.

13. A tubular film according to claim 7, when the copolymer has a melt flow index between 0.5 and 10.

14. A tubular film according to claim 7, wherein the metal ion has a valency of 2.

15. A tubular film according to one of claims 1 to 3, characterized in that it contains as modified polyolefins quaternary polymers that consist of
   approximately 71 to 90 parts by weight of ethylene
   approximately 3 to 9 parts by weight of an aliphatic ethylenically unsaturated carboxylic acid having 3 to 5 carbon atoms
   approximately 1 to 20 parts by weight of $C_1$–$C_8$ alkyl ester of an aliphatic, ethylenically unsaturated carboxylic acid having 3 to 5 carbon atoms and 0.3 to 5 parts by weight, preferably 0.8 to 5 parts by weight, of isobutylene,
wherein the sum of the parts by weight is 100.

16. A tubular film according to claim 15, characterized in that it contains a copolymer that consists of
   approximately 71 to 90 parts by weight of ethylene
   approximaely 3 to 9 parts by weight of acrylic acid
   approximately 1 to 20 parts be weight of the tertiary butyl ester of acrylic acid, and 0.8 to 3 parts by weight of isobutylene,
wherein the sum of the parts by weight is 100.

17. A tubular film according to one of Claims 1 to 3, characterized in that it contains, as component B, copolymers of ethylene selected from the group consisting of copolymers of ethylene with an α,β-saturated carboxylic acid and an acid derivative, the amount of ethylene being at least 50% of said copolymers and the amount of acid and acid derivative being 1 to 50% together and 1 to 25% for each acid and acid derivative.

18. A tubular film according to claim 17 wherein the unsaturated carboxylic acid is consisting of acrylic or methacrylic acid.

19. A tubular film according to claim 17 wherein said acid derivative is selected from the group consisting of alkyl esters of said carboxylic acid and acid anhydride of said carboxylic acid.

20. A tubular film according to one of Claims 1 to 3 characterized in that it contains in addition to or instead of an ionomer resin a polymer blend consisting of
   (I) graft copolymers of an α-olefin which is grafted with one or more materials, selected from the group consisting of acyclic, isocyclic or heterocyclic acid anhydrides and,
   (II) a polymer selected from the group consisting of EVA-copolymers, HDPE, LDPE, copolymers of HDPE with propylene, copolymers of HDPE with butene, copolymers of HDPE with dienes, terpolymers of HDPE with propylene, terpolymers of HDPE with butene, terpolymers of HDPE with dienes, copolymers of LDPE with propylene, copolymers of LDPE with butene, copolymers of LDPE with dienes, terpolymers of LDPE with propylene, terpolymer of LDPE with butene and terpolymers of LDPE with dienes.

21. A tubular film according to claim 20 characterized in that it contains 1–30 percent by weight of component 1 and 99–70 percent by weight of component 2.

22. A tubular film according to claim 21 characterized in that it contains 3 to 12% by weight of component I and 1 and 97 to 88% by weight of component II.

23. A tubular film according to claim 20 wherein the α-olefin is HDPE.

24. A tubular film according to claim 20 wherein the heterocyclic acid anhydride is x-methylbicyclo-5-en-2,3-dicarboxylic acid anhydride.

25. A tubular film according to claim 20 wherein the polymer is an EVA copolymer with a vinyl acetate proportion of about 5% by weight.

26. A tubular film according to one of claims 1 to 3, characterized in that it consists of a mixture of approximately 70 to 86 parts by weight of component A, and approximately 14 to 30 parts by weight of component B, wherein the sum of the parts by weight is 100.

27. A tubular film according to claim 26, characterized in that it consists of a mixture of approximately 75 to 83 parts by weight of component A and 17 to 25 parts by weight of component B, wherein the sum of the parts by weight is 100.

28. A tubular film according to one of claims 1 to 3, characterized in that the breaking stress of said film in the stretched state is at least twice its breaking stress in the unstretched state and the stress-strain curve of the film exhibits an elastic behavior up to approximately 10% below the breaking stress.

29. A tubular film according to one of claims 1 to 3, characterized in that it is straight or is curved like a wreath.

30. A process for the production of a tubular film according to one of claims 1 to 3, characterized in that the mixture of components A and B is shaped into a tubular film and the tubular film formed is then biaxially stretched.

31. A process according to claim 30, characterized in that the biaxial stretching is carried out using longitudinal and transverse stretching ratios that are in the range of from approximately 1:1.5 to 1:4.

32. A process according to claim 31, characterized in that, after stretching, the tubular film is subjected to a thermofixing process for the purpose of stabilizing the shape.

* * * * *

UNITED STATES PATENT AND TRADEMARK OFFICE
CERTIFICATE OF CORRECTION

PATENT NO. : 4,303,711

DATED : December 1, 1981

INVENTOR(S) : Erk et al.

It is certified that error appears in the above—identified patent and that said Letters Patent is hereby corrected as shown below:

First page, Item 75, delete "Turkey" and substitute therefor --Federal Republic of Germany--; First page, 8th line of Abstract, "293 K," should read --253 K,--. Col. 7, line 34, "the" (second occurrence) should read --The--. Col. 9, line 17, " 'g " should read --1 g--; Col. 9, line 37, "hexamethylene-sebasic" should read --hexamethylenesebacic--. Seventh Page, Table 2, Column 9, "gut" should read --good--. Col. 13, line 63, "and" should read --an--. Col. 14, line 27, "approximaely" should read --approximately--; Col. 14, line 28, "be weight" should read --by weight--.

Signed and Sealed this

Twenty-eighth Day of February 1984

[SEAL]

Attest:

GERALD J. MOSSINGHOFF

Attesting Officer    Commissioner of Patents and Trademarks